US008045999B2

(12) United States Patent
Shim

(10) Patent No.: US 8,045,999 B2
(45) Date of Patent: *Oct. 25, 2011

(54) LOCATION INFORMATION SYSTEM AND METHOD FOR PERFORMING NOTIFICATION BASED UPON LOCATION

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/498,268

(22) Filed: Jul. 6, 2009

(65) Prior Publication Data

US 2009/0286536 A1 Nov. 19, 2009

Related U.S. Application Data

(63) Continuation of application No. 11/606,077, filed on Nov. 30, 2006.

(60) Provisional application No. 60/741,064, filed on Dec. 1, 2005.

(30) Foreign Application Priority Data

| Jul. 14, 2006 | (KR) | 10-2006-0066572 |
| Nov. 9, 2006 | (KR) | 10-2006-0110602 |
| Feb. 16, 2009 | (KR) | 10-2009-0012619 |
| Feb. 16, 2009 | (KR) | 10-2009-0012620 |
| Feb. 16, 2009 | (KR) | 10-2009-0012621 |
| Feb. 16, 2009 | (KR) | 10-2009-0012622 |
| Feb. 16, 2009 | (KR) | 10-2009-0012623 |

(51) Int. Cl.
*H04W 24/00* (2009.01)
*H04W 4/00* (2009.01)
*H04M 11/04* (2006.01)

(52) U.S. Cl. ............... 455/456.2; 455/432.1; 455/433; 455/456.1; 455/456.3; 455/456.5; 455/456.6; 455/457; 455/404.2

(58) Field of Classification Search .... 455/432.1–435.3, 455/456.1–457, 404.2
See application file for complete search history.

(56) References Cited

U.S. PATENT DOCUMENTS 6,463,289 B1 10/2002 Havinis et al.
(Continued)

FOREIGN PATENT DOCUMENTS

EP 1387590 A2 2/2004
(Continued)

OTHER PUBLICATIONS

OMA, Secure User Plane Location Architecture Nov. 2005, OMA, 80 pages.*

(Continued)

*Primary Examiner* — Nick Corsaro
*Assistant Examiner* — Munsoon Choo
(74) *Attorney, Agent, or Firm* — Birch, Stewart, Kolasch & Birch, LLP

(57) ABSTRACT

According to an embodiment, a location based notification method in a H-SLP (Home-SUPL Location Platform) includes receiving, by the H-SLP, a request for positioning of a roaming terminal; transmitting, a session initialization message including a notification mode parameter to the roaming terminal if one or more of location-based notification and verification are required as a result of checking a privacy of the roaming terminal; transferring a positioning start message to a V-SLP (Visited-SUPL Location Platform) if the H-SLP receives the positioning initialization message from the roaming terminal; receiving a calculated location of the roaming terminal from the V-SLP; and transmitting a session notification message including a notification element to the roaming terminal if the H-SLP receives the calculated location of the roaming terminal.

7 Claims, 7 Drawing Sheets

U.S. PATENT DOCUMENTS

| | | | |
|---|---|---|---|
| 7,369,860 B2 | 5/2008 | Dietrich et al. | |
| 7,558,584 B2 | 7/2009 | Yamamoto et al. | |
| 7,873,370 B2 | 1/2011 | Shim | |
| 2004/0127229 A1 | 7/2004 | Ishii | |
| 2004/0203901 A1* | 10/2004 | Wilson et al. | 455/456.1 |
| 2005/0118999 A1 | 6/2005 | Zhu | |
| 2005/0239480 A1* | 10/2005 | Kim et al. | 455/456.1 |
| 2005/0250516 A1 | 11/2005 | Shim | |
| 2006/0079249 A1 | 4/2006 | Shim | |
| 2006/0246919 A1* | 11/2006 | Park et al. | 455/456.1 |

FOREIGN PATENT DOCUMENTS

| | | | |
|---|---|---|---|
| EP | 1589350 A1 | | 10/2005 |
| JP | 2003143633 A | | 5/2003 |
| JP | 2003-230172 A | | 8/2003 |
| JP | 2005-312057 A | | 11/2005 |
| KR | 10-2003-0052841 | | 6/2003 |
| KR | 10-2005-0074410 A | * | 8/2005 |
| KR | 10-0897793 B1 | | 5/2009 |
| RU | 2263412 C2 | | 3/2004 |
| RU | 2233412 C2 | | 7/2004 |
| RU | 2235341 C2 | | 8/2004 |
| WO | WO 99/27746 A1 | | 6/1999 |
| WO | WO 01/74102 A1 | | 10/2001 |
| WO | WO 03/045099 A1 | | 5/2003 |
| WO | WO 2006/014091 A1 | | 2/2006 |
| WO | WO 2006/118373 A1 | | 11/2006 |

OTHER PUBLICATIONS

Secure User Plane Location Architecture, Candidate Version 1.0—Nov. 21, 2005, Open Mobile Alliance, OMA-AD-SUPL-V1_0-20051121- C, pp. 1-80.

Office Action issued Oct. 19, 2009 in corresponding U.S. Appl. No. 12/498,199.

3GPP TS23.271 version 6.10.0 Release 6, Dec. 2004.

3GPP TR 23.871, V5.0.0 (Jul. 2002) 3rd Generation Partnership Project; Technical Specification Group Services and System Aspects; Technical Report Enhanced Support for User Privacy in location services, XP14021953, pp. 1-27.

3GPP TS 23.271 V7.2.0, "3rd Generation partnership project; Technical specification group services and system aspects; functional stage 2 description of Location Services (LCS)," Oct. 2005, XP002604508, pp. 1-122.

3GPP TSG-SA WG2 Meeting #46, "Notification based on current location of target UE," URL:http://www.3gpp.org/ftp/tsg_sa/WG2_Arch/TSGS2_46_Athens/Docs, LG Electronics, Inc., May 2005, XP002604484, pp. 1-40.

Shim, "Notification based on current location," Open Mobile Alliance, URL:http://member.openmobilealliance.org/ftp/Public_documents/LOC/2005. Dec. 2005, XP002604914, pp. 1-4.

Shim, "Use case for notification based on current location for SUPL 2.0," Open Mobile Alliance, URL:http://member.openmobilealliance.org/ftp/Public_documents/LOC/2005, Sep. 2005, XP002604483, pp. 1-3.

Shim, Notification based on current location for SUPL 2.0, Open Mobile Alliance, URL:http://member.openmobilealliance.org/ftp/Public_documents/LOC/2005, Oct. 2005, XP002604396, pp. 1-3.

LOC WG, SUPL Interface efficiency, OMA-LOC-2004-0074-L, ATE-SUPL_Interface_Efficiency, 2004, p. 2-3, http://member.openmobilealliance.org//ftp/Public_documents/LOC/2004/OMA-LOC-2004-074-LATE-LATE-SUPL_Interface_Efficiency.zip, Mar. 5, 2004.

Shim, "Notification Based on Current Location for SUPL 2.0", Input Contribution, Open Mobile Alliance Ltd., vol. OMA LOG WG 2005, No. OMA-LOCK-2005-0478-IC-SPL_AD_2_10, Oct. 10, 2005, pp. 1-5, submitted on Jul. 11, 2011.

* cited by examiner

LOCATION INFORMATION SYSTEM AND METHOD FOR PERFORMING NOTIFICATION BASED UPON LOCATION

This Application is a Continuation of co-pending U.S. patent application Ser. No. 11/606,077, filed Nov. 30, 2006, and claims priority under 35 U.S.C. §119 on U.S. Provisional Application No. 60/741,064 filed Dec. 1, 2005, Korean Patent Application No. 10-2006-0066572 filed Jul. 14, 2006, Korean Patent Application No. 10-2006-0110602 filed Nov. 9, 2006, Korean Patent Application No. 10-2009-0012619 filed Feb. 16, 2009, Korean Patent Application No. 10-2009-0012620 filed Feb. 16, 2009, Korean Patent Application No. 10-2009-0012621 filed Feb. 16, 2009, Korean Patent Application No. 10-2009-0012622 filed Feb. 16, 2009, and Korean Patent Application No. 10-2009-0012623 filed Feb. 16, 2009. Please note Korean Patent Application Nos. 10-2009-0012619, 10-2009-0012620, 10-2009-0012621, 10-2009-0012622 and 10-2009-0012623 are divisionals of Korean Patent Application Nos. 10-2006-0066572 and 10-2006-0110602. The entire contents of each of these applications are hereby incorporated by reference in their entirety.

TECHNICAL FIELD

The present invention relates to a location information system, and more particularly, to a location information system and method for performing a notification based upon location in a Secure User Plane Location (SUPL) network.

BACKGROUND ART

In general, in order to provide location services to a user, considerable signaling and location information should be transferred between a mobile terminal and a location server. The so-called positioning technologies have been standardized for providing such location services, for example, a location service based upon the location (position) of a mobile device, are undergoing rapid widespread dissemination.

The positioning technologies can be provided through a user plane and a control plane. A Secure User Plane Location (SUPL) which is well-known as an example of the positioning technologies provides the location services through the user plane.

The SUPL technology is an efficient method for transferring location information required for the location calculation (i.e., positioning) of a mobile station. The SUPL employs a user plane data bearer so as to transfer positioning assistance information such as Global Positioning System (GPS) assistance, and to carry positioning technology associated protocols between the mobile terminal and a network.

In general, a SUPL network associated with location services in the location information system includes a SUPL agent, a SUPL Location Platform (SLP) and a SUPL Enabled Terminal (SET). The SUPL agent refers to a logical service access point using location information which is actually measured. The SLP refers to a SUPL service access point at a network portion where network resources are accessed to obtain location information. The SET refers to a device for communicating with the SUPL network using a SUPL interface, for instance, a User Equipment (UE) of the UMTS, a Mobile Station (MS) of GSM, a IS-95 MS, laptop computers or Personal Digital Assistants (PDAs) which have a SET function, or the like. The SET may also be one of various mobile terminals which is connected through a Wideband LAN (WLAN). The SET supports various procedures defined by the SUPL by being connected to the network via the user plane bearer.

In a mobile communications system such as the location information system, many terminal users desire that different privacy policies be applied according to the current locations of their terminals. That is, a user may want to receive a positioning request notification based on a current location of his terminal so as to restrict the accessing of location information by a third party. For instance, positioning of his terminal can be granted when at home, but may require positioning request notification be performed when he is at work in his office.

Thus, privacy rules may be applied differently according to the user who requests positioning and a location of the SET (e.g., home, office, etc.) in a location information system, for example, a SUPL network. Therefore, if the SET is located within a specific area, before the location of the SET is reported to a user (a third party) who requests positioning, a location server performs an appropriate privacy checking procedure according to the corresponding user and the location of the SET. Preferably, the SET, being a device capable of communicating with the SUPL network, may be one of a User Equipment (UE) of the UMTS, a Mobile Station (MS) of GSM, a IS-95 MS, or the like. In the present invention, the SET will be simply referred to as a terminal.

However, the notification by the location server is simply requested by transmitting a notification element to the SET regardless of the user or location of the SET. Accordingly, there is no way for the SET side to recognize whether the corresponding notification request is performed based upon the location (or based on the user), which results in an unstable system due to an unclear time point of a notification response from the SET. In a SUPL network structure, only the functions of each SUPL device have been suggested thus far, while a signal transfer system between each SUPL device for transferring location information is still being discussed. Accordingly, needs for the signal transfer system are more brought out.

DISCLOSURE OF THE INVENTION

Therefore, it is an object of the present invention to provide a location information system and method by which a terminal can identify a type of notification performed by a location server.

To achieve these objects, there is provided a location based notification method in a mobile communications system comprising: receiving a session initial message including a notification mode parameter (indicator) from a location server; and checking the received notification mode parameter so as to determine whether the notification is performed based upon the location of the SET.

Preferably, the notification mode parameter indicates whether a notification/verification by the location server is a normal notification/verification or a notification/verification based upon location.

Preferably, if the notification mode parameter is the notification/verification based upon the location, the terminal does not transmit a session end message until it receives a session notification message.

Preferably, if the notification/verification is not based upon the location of the terminal, the terminal transmits the session end message to the location server.

To achieve these objects, there is provided a mobile communications terminal adapted to a location information system according to the present invention, the terminal comprising: a Radio Frequency (RF) unit for receiving a session initial message including a notification mode parameter from a location server; and a signal processing unit (processor) for checking the received notification mode parameter so as to determine whether the notification is performed based upon the location of the terminal.

Preferably, the notification mode parameter indicates whether a notification/verification performed by the location server is a normal notification/and verification or a notification/verification based upon location.

Preferably, the signal processing unit does not transmit a session end message until it receives a session notification message when the notification mode parameter is a notification/verification based upon the location.

Preferably, the signal processing unit transmits the session end message to the location server when the notification/verification is not performed based upon the location of the terminal.

According to an embodiment, the invention is directed to a location based notification method in a H-SLP (Home-SUPL Location Platform) for calculating and providing a location of a roaming terminal according to a client's request, the method comprising: receiving, by the H-SLP, a request for positioning of a roaming terminal; transmitting, by the H-SLP, a session initialization message including a notification mode parameter to the roaming terminal if one or more of location-based notification and verification are required as a result of checking a privacy of the roaming terminal; transferring, by the H-SLP, a positioning start message to a V-SLP (Visited-SUPL Location Platform) if the H-SLP receives the positioning initialization message from the roaming terminal; receiving, by the H-SLP, a calculated location of the roaming terminal from the V-SLP; transmitting, by the H-SLP, a session notification message including a notification element to the roaming terminal if the H-SLP receives the calculated location of the roaming terminal; receiving, by the H-SLP, a session notification response message including a notification response by the user of the roaming terminal from the roaming terminal; and transmitting, by the H-SLP, the location of the roaming terminal to a client who has requested the location of the terminal in response to the received session notification response message.

MODES FOR CARRYING OUT THE PREFERRED EMBODIMENTS

The present invention may be implemented for a SUPL network. However, the present invention may be applicable to radio (wireless) communications systems which are operated according to other specifications. Hereinafter, reference will be made in detail to the preferred embodiments of the present invention.

In the present invention, when an application (i.e., a server system) transmits a positioning request made by a third party (i.e., a client system) to a terminal (or a User Equipment (UE)), the application transmits it together with a notification mode parameter (indicator), which allows the terminal to check the received notification mode parameter to thusly determine whether the notification is performed based upon the location of the terminal. If it is checked the notification is performed based upon the location of the terminal, the location server maintains a session with the terminal until an actual notification element is transmitted from the location server after positioning. If the notification is not performed based upon the location of the terminal, the terminal transmits a session end message to the location server.

For this, in the present invention, when a Location Services (LCS) client requests positioning of a target SUPL Enabled Terminal (SET), a SUPL Location Platform (SLP) within the location server transmits to the SET a SUPL initial (SUPL INIT) message which includes the notification mode parameter. Preferably, the notification mode parameter denotes a parameter indicating whether a notification and/or verification transmitted from the location server is a normal notification/verification or a notification/verification based upon location.

In general, in a SUPL network, a SLP which is a location server is constituted with a SUPL Positioning Center (SPC) which is an entity for calculating an actual location and a SUPL Location Center (SLC) which manages other functions of the SLP excepting the calculating of the location information, for instance, roaming, resource managing, and the like. Therefore, the SET calculates location information through a communication with the SPC via the SLC in case of a proxy mode, while calculating location information by performing a direct connection to the SPC in case of a non-proxy mode.

Hereinafter, the location based notification method in a location information system according to the present invention will be explained based upon a proxy mode and a non-proxy mode.

Figure 1:
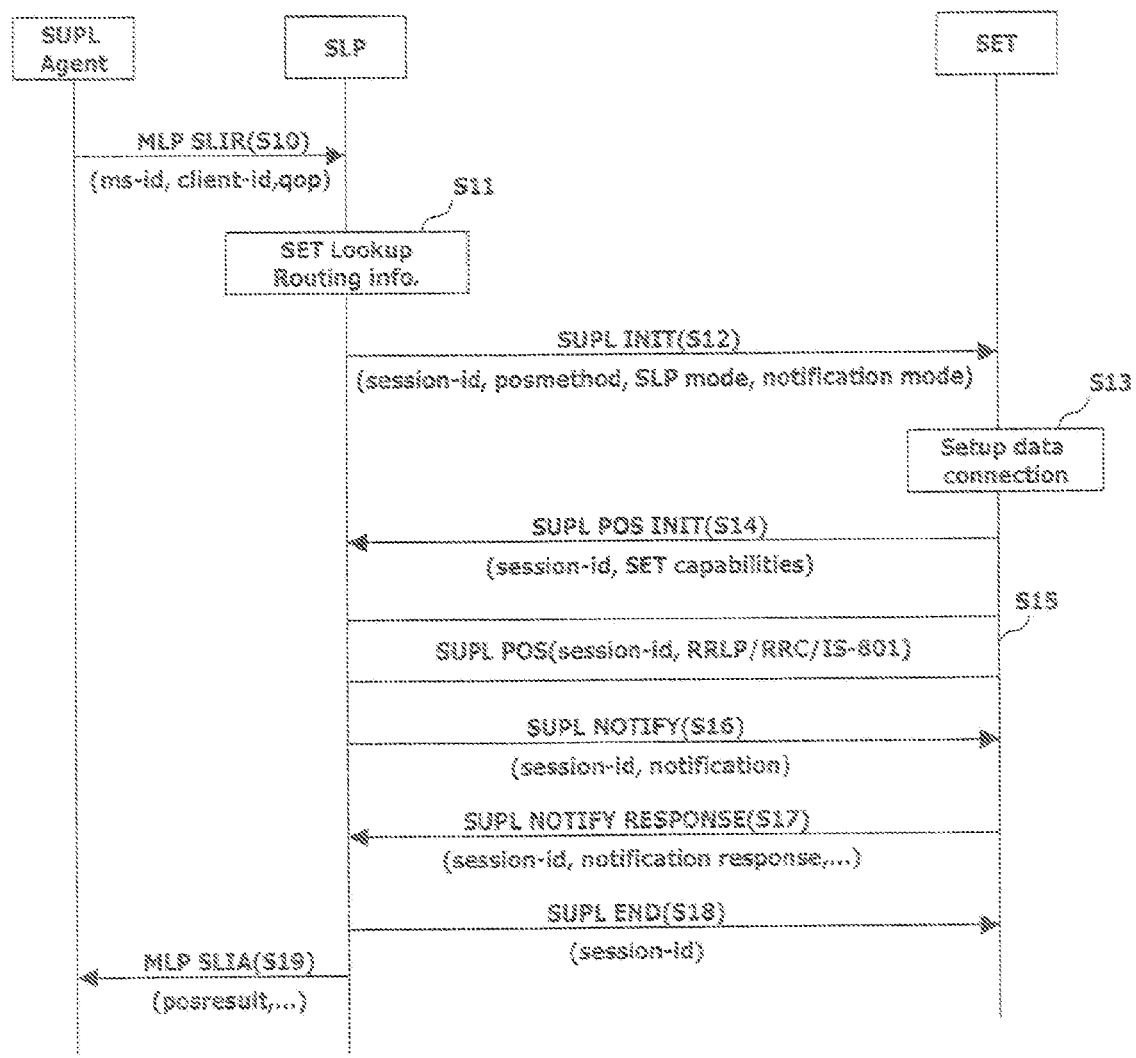
FIG. 1 illustrates a first embodiment of a location based notification method in a location information system according to the present invention, which illustrates a case that a terminal is not roaming in a proxy mode.

FIG. 1 illustrates a first embodiment of a location based notification method in a location information system according to the present invention, which illustrates a case that the terminal is not roaming in a proxy mode. Here, the SLP corresponds to a network side and the SET corresponds to a terminal side.

As illustrated in FIG. 1, when a LCS client requests positioning of the SET from a SUPL agent within a network, the SUPL agent transfers the positioning request made by the LCS client to the SLP through a Mobile Location Protocol (MLP) Standard Location Immediate Request (SLIR) message (S10). The MLP SLIR message may include ms-id, lcs-client-id, QoP (Quality of Position), and the like.

The SLP checks whether the SUPL agent is authenticated (authorized) for location services based upon the received lcs-client-id. The SLP then performs a privacy checking procedure based upon the ms-id and the lcs-client-id, namely, checks from an external Privacy Checking Entity (PCE) whether the LCS client is granted for the positioning based upon the ms-id and the lcs-client-id. The SLP can perform the privacy checking by requesting to the PCE or by directly receiving privacy information from the PCE. Also, the SLP checks whether a previously computed location of the SET satisfies a required QoP.

According to the checked results, if the previously computed location of the SET satisfies the required QoP and any notification and/or verification is not needed to be performed, the SLP directly proceeds to the step of S19 to thusly transfer the previously computed location value of the SET to the SUPL agent.

Conversely, if the previously computed SET location does not satisfy the required QoP and a notification and/or verification is needed to be performed, the SLP determines whether the SET supports the SUPL using a SET lookup table, and checks (confirms) whether the SET currently belongs to a service area (i.e., whether the SET is roaming) using routing information (S11).

Upon completing the checking of the SUPL agent authentication (authorization) and the privacy checking of the LCS client, the SLP transmits a session initial (i.e., SUPL INIT) message to the SET to thus initiate a positioning session with the SET (S12). The SUPL INIT message may be a WAP PUSH or an SMS trigger, and include at least parameters, such as session-id, positioning methods (posmethod), SLP modes (i.e., proxy/non-proxy), notification mode, and the like.

The notification mode parameter is used to allow a SET side to identify that the notification transmitted from the SLP is performed based upon location. That is, so far, the SET could not identify whether the notification transmitted from the SLP indicates a normal notification or a notification based upon location. Hence, when the SLP requests a notification, the SET queries to a SET user regardless of types of notification/verification and thereafter transmits the response result of the querying immediately to the SLP.

However, when the notification request made by the location server is a notification based upon the location, the SET should not immediately transmit the notification response to the SLP but transmit it after performing a SUPL positioning process.

Preferably, the normal notification/verification indicates a notification/verification other than the notification/verification based upon the location, for example, a notification/verification based upon a user.

The definition and type of the notification mode parameter has been illustrated in [Table 1] as follows.

TABLE 1

| Parameter | Presence | Values/description |
| --- | --- | --- |
| Notification Mode | — | Describes the mode whether the notification and Verification is based on location or not. This parameter can be of type Normal Notification/Verification Notification/Verification based on location |

Referring to [Table 1], a type of the notification mode parameter is set to a normal notification/verification or a notification/verification based upon location. The normal notification/verification is set to "0", and the notification/verification based upon location is set to "1". Also, when the notification or verification is required to be performed according to the result of the privacy checking, the SLP may include a notification mode parameter in the SUPL INIT message.

When the SUPL INIT message is received from the SLP, the SET is connected to packet data network (e.g., a 3GPP or 3GPP2 network) when data connection is currently not opened (set) to any network (S13). Once completing the data connection setup, the SET checks whether the notification is performed based upon location using the notification mode parameter included in the SUPL INIT message.

According to the checked result, if the notification performed by the SLP is not based upon the location, the SET queries to the SET user as to whether to grant permission for positioning according to notification rules. If the user grants permission for the positioning, the SET transmits a SUPL POS INIT message to the SLP, and, if not, the SET transmits to the SLP a session end (i.e., SUPL END) message (not shown) which includes the user's notification response. Conversely, if the notification is performed based upon the location, the SET transmits to the SLP a SUPL POS INIT message which does not include any notification response (i.e., holds the notification response), to thus initiate a positioning session with the SLP (S14).

The SUPL POS INIT message may include at least session-id, SET capabilities and location identifier (lid). The SET capabilities may include location measuring (positioning) methods (e.g., MS assisted A-GPS, MS based A-GPS, and cell-id method) and associated location measuring (positioning) protocols (e.g., RRLP, RRC, and TIA-801). Also, the SET can further provide NMR for radio technologies (e.g., GSM: TA, and RXLEV) to be used.

When the SUPL POS INIT message is received from the SET, the SLP determines which positioning protocol (RRLP, RRC, and TIA-801) should be used based upon the positioning method (posmethod) supported by the SET.

Therefore, the SLP and the SET sequentially exchange several successive positioning procedure message (RRLP, RRC, and TIA-801) to calculate the location of the SET (S15). The location is calculated based upon measurements that the SLP has received from the SET (MS assisted), or assistance that the SET has obtained from the SLP (MS based).

When the SUPL positioning process is completed, the SLP checks whether to grant permission for positioning of a user who has requested the positioning on the calculated location of the SET by directly requesting to the PCE or by using privacy information received from the PCE. According to the checked result, when a notification to the SET user is required to be performed (i.e., when positioning of the SET is conditionally granted), the SLP transmits a session notification (SUPL NOTIFY) message including a notification element to the SET (S16). Preferably, the SUPL NOTIFY message may include session-id and a notification parameter.

When receiving the SUPL NOTIFY message, the SET recognizes that the notification by the SLP is performed based upon location. The SET then queries to the SET user as to whether the location value of the SET should be transmitted, and thereafter transmits a notification response of the SET user to the SLP through a session notification response (i.e., SUPL NOTIFY RESPONSE) message (S17). Preferably, the SUPL NOTIFY RESPONSE message may include session-id and a notification response parameter. The definition and type of the notification type parameter has been shown in [Table 2] as follows.

TABLE 2

| Parameter | Presence | Value/description |
| --- | --- | --- |
| Notification Response | — | Describes the mode whether the notification/verification response from the user |
| Notification Response type | M | Type of notification response: Allowed Not allowed |

Hence, upon completely calculating the location of the SET, the SLP transmits a SUPL END message to the SET to inform that the positioning process is not initiated any more (S18). Also, when the user's notification response included in the SUPL NOTIFY RESPONSE message is set to "allowed", namely, if the SET user grants permission for transmitting of the positioning resultant value (i.e., the calculated current location of the SET), the SLP transmits a MLP Standard Location Immediate Answer (SLIA) message including the location value of the SET to the SUPL agent (S19).

As aforementioned, the present invention can transmit to the SET the notification mode parameter through the SUPL INIT message so as to allow the SET to identify whether the notification/verification transmitted from the SLP is the normal notification/verification (i.e., the notification/verification based upon a user) or a notification/verification based upon location.

Figure 2:
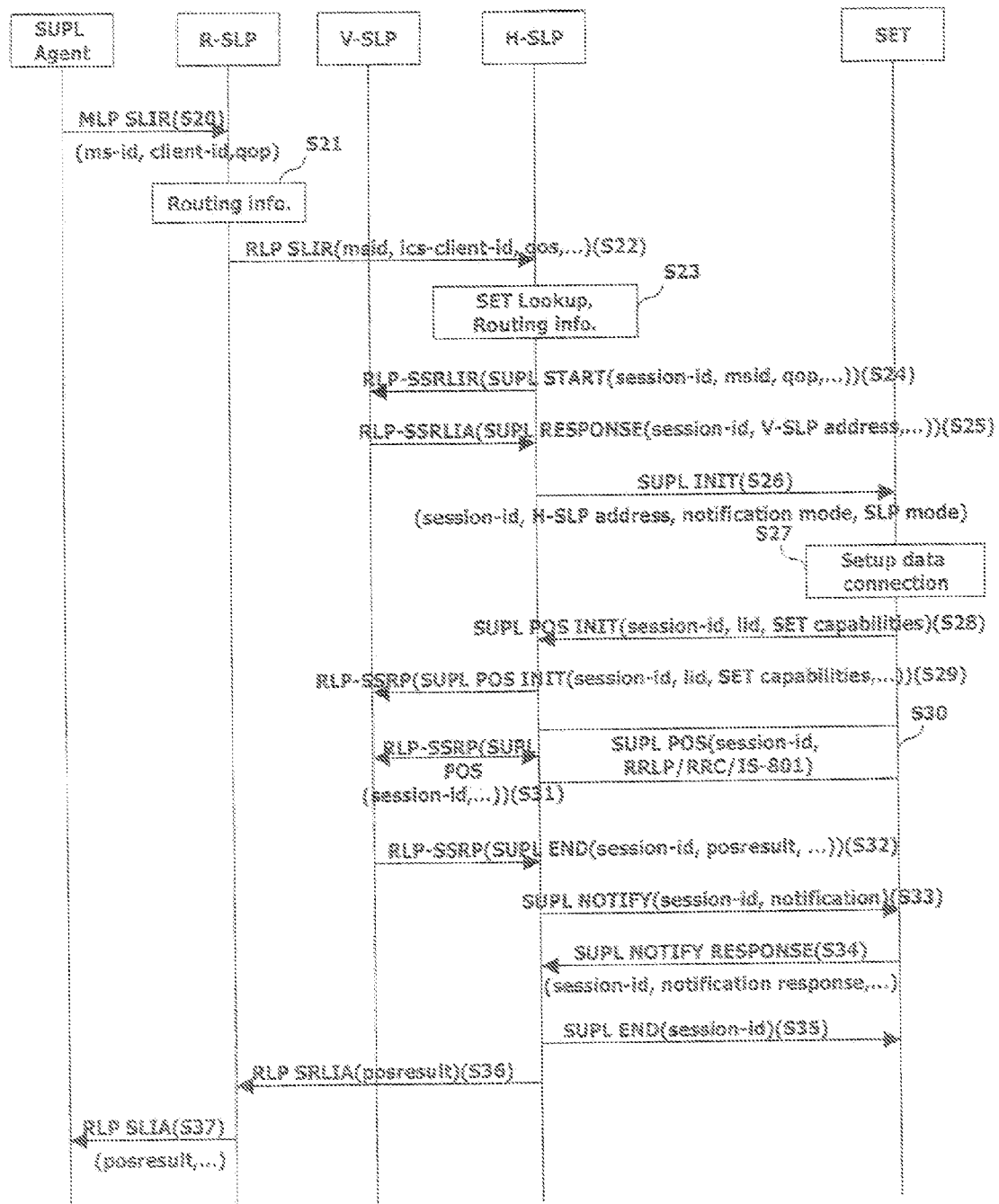
FIG. 2 illustrates a second embodiment of a location based notification method in a location information system according to the present invention, which illustrates a case that a terminal is roaming in a proxy mode.

FIG. 2 illustrates a second embodiment of a location based notification method in a location information system according to the present invention, which illustrates a case that the terminal is roaming in a proxy mode. Here, a H-SLP denotes a SLP within a home network, and a V-SLP denotes a SLP within a visited network. Also, a Requesting SLP (R-SLP) denotes a SLP to which an external client is initially connected when initiating a SUPL procedure in a network.

The second embodiment of the present invention shown in FIG. 2 is the same as the first embodiment of the present invention excepting those fact that the H-SLP receives a positioning request from the SUPL agent via the R-SLP, and RLP protocol messages are used such that messages are exchanged between the V-SLP and the H-SLP to thus initiate a SUPL session, transfer positioning session and inform the starting of the SUPL positioning process. Especially, the second embodiment of the present invention may be applied when the V-SLP performs positioning with the SET.

As illustrated in FIG. 2, the SUPL agent requests positioning of the LCS client from the R-SLP through a MLP SLIR message (S20). The MLP SLIR message may include ms-id, lcs-client-id, Quality of Position (QoP), and the like.

When receiving the MLP SLIR message, the R-SLP checks whether the SUPL agent is authorized for location services based upon the lcs-client-id, and determines a H-SLP based upon the ms-id. Also, the R-SLP checks whether the SET currently belongs to a service area (i.e., whether the SET is roaming) using routing information (S21). Upon the completion of such series of operations, the R-SLP transfers the request for the positioning of the LCS client to the H-SLP using a RLP protocol message (i.e., RLP SLIR) (S22).

The H-SLP performs a privacy checking based upon the ms-id and the lcs-client-id, and determines whether the SET supports the SUPL using a SET lookup table. The H-SLP then determines whether the SET is currently located within a service area (i.e., whether the SET is roaming) using routing information (S23).

If it is determined that the SET supports the SUPL and is roaming, the H-SLP transmits a RLP-SSRLIR message to the V-SLP to inform that the SET is to initiate the SUPL positioning process (S24). The V-SLP informs the H-SLP that the SUPL positioning process is ready to be initiated through a RLP-SSRLIA message (S25). The RLP-SSRLIR message may include at least session-id, ms-id and QoP, and the RLP-SSRLIA message may include at least session-id, and a V-SPC address.

Therefore, the H-SLP transmits a SUPL INIT message to the SET to initiate a positioning session with the SET (S26). The SUPL INIT message may be a WAP PUSH or an SMS trigger, and include at least session-id, positioning methods (posmethod), SLP mode (proxy/non-proxy), a notification mode, and the like.

When receiving the SUPL INIT message from the H-SLP, the SET is connected to packet data network (e.g., a 3GPP or 3GPP2 network) when data connection is currently not opened (set) to any network (S27). Once completing the data connection setup, the SET queries to a SET user as to whether to grant permission for positioning according to notification rules, and checks whether the notification is performed based upon a location of the SET using the notification mode parameter value included in the SUPL INIT message.

If it is checked that the notification performed by the SLP is not based upon the location of the SET, the SET transmits a SUPL POS INIT message including a notification response of the SET user to the H-SLP to initiate a positioning session with the H-SLP. If it is checked that the notification performed by the SLP is based upon the location of the SET, the SET transmits to the H-SLP a SUPL POS INIT message which does not include a notification response to thusly start the positioning session with the H-SLP (S28). The SUPL POS INIT message may include at least session-id, SET capabilities and a location identifier (lid). The SET capabilities may include location measuring (positioning) methods (e.g., MS assisted A-GPS, MS based A-GPS, and cell-id method) and associated location measuring (positioning) protocols (e.g., RRLP, RRC, and TIA-801).

When the SUPL POS INIT message is received from the SET, the H-SLP transfers the SUPL POS INIT message to the V-SLP through a RLP-SSRP message (S29). The V-SLP then determines which positioning protocol (RRLP, RRC, and TIA-801) should be used based upon the positioning method (i.e., posmethod) supported by the SET.

Therefore, the V-SLP and the H-SLP sequentially exchange several successive positioning procedure message (RRLP, RRC, and TIA-801) to calculate the location of the SET (S30 and S31). The location is calculated based upon measurements that the V-SLP has received from the SET (MS assisted), or assistance that the SET has obtained from the V-SLP (MS based).

When the SUPL positioning process is completed, the V-SLP transmits a SUPL END message including the calculated location value of the SET through the RLP-SSRP message (S32). The H-SLP checks whether to grant permission for positioning of the user who has requested the positioning on the calculated location of the SET by directly requesting to the PCE or by using privacy information received from the PCE.

According to the checked result, when a notification to the SET user is needed to be performed (i.e., when the positioning of the SET is conditionally granted), the H-SLP transmits a SUPL NOTIFY message including a notification element to the SET (S33). When receiving the SUPL NOTIFY message from the H-SLP, the SET recognizes that the notification performed by the H-SLP is a notification based upon location. Accordingly, the SET queries to the SET user as to whether the location value of the SET should be transmitted, and thereafter transmits a notification response of the SET user to the H-SLP through a SUPL NOTIFY RESPONSE message (S34).

Thus, the H-SLP transmits a SUPL END message to the SET to inform that the positioning process is not initiated any more (S35). Also, when the user's notification response included in the SUPL NOTIFY RESPONSE message is set to "allowed", namely, if the SET user grants permission for transmitting of the positioning resultant value (i.e., the calculated current location of the SET), the H-SLP transmits a MLP SRLIA message including the location value of the SET to the R-SLP (S36). The R-SLP finally transmits a MLP SLIA message including the location value of the SET to the SUPL agent (S37).

Figure 3:
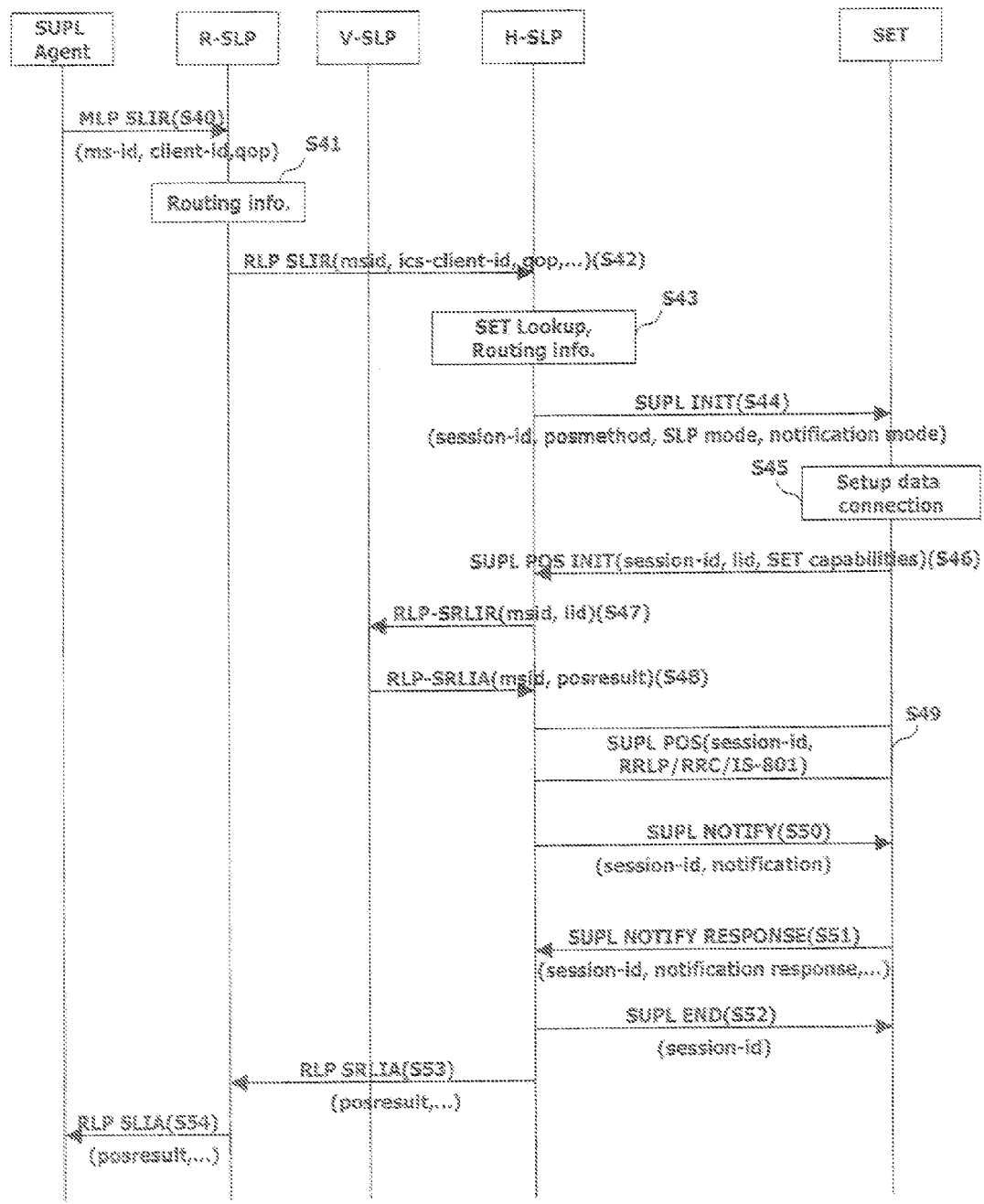
FIG. 3 illustrates a third embodiment of a location based notification method in a location information system according to the present invention, which illustrates a case that a terminal is roaming in a proxy mode.

FIG. 3 illustrates a third embodiment of a location based notification method in a location information system according to the present invention, which illustrates a case that a terminal is roaming in a proxy mode. The third embodiment of the present invention is the same as the second embodiment of the present invention excepting the fact that the H-SLP performs positioning with the SET.

First, the SUPL agent transfers a request for positioning of the LCS client to the R-SLP through a MLP SLIR message (S40). The R-SLP checks whether the SUPL agent is authorized for location services based upon lcs-client-id, and determines the H-SLP based upon ms-id. The MLP SLIR message may include ms-id, lcs-client-id and QoP. Also, the R-SLP checks whether the SET currently belongs to a service area (i.e., whether the SET is roaming) using routing information (S41).

Upon completing such series of operations, the R-SLP transfers the request for the positioning of LCS client using the RLP protocol message (i.e., RLP SLIR) (S42). The H-SLP performs a privacy checking based upon the ms-id and the lcs-client-id, and determines whether the SET supports the SUPL using the SET lookup table. The H-SLP then determines whether the SET is currently located within a service area (i.e., whether the SET is roaming) using routing information (S43).

If it is determined that the SET supports the SUPL and is roaming, the H-SLP transmits a SUPL INIT message to the SET to initiate a positioning session with the SET (S44). The SUPL INIT message may be a WAP PUSH or an SMS trigger, and include at least session-id, positioning methods (posmethod), SLP mode (proxy/non-proxy), a notification mode, and the like.

When receiving the SUPL INIT message from the H-SLP, the SET is connected to a packet data network (e.g., a 3GPP or 3GPP2 network) when data connection is currently not opened (set) to any network (S45). Once completing the data connection setup, the SET queries to a SET user as to whether to grant permission for positioning according to notification rules, and checks whether the notification is performed based upon a location of the SET using the notification mode parameter value included in the SUPL INIT message.

If it is checked that the notification performed by the SLP is not based upon the location of the SET, the SET transmits a SUPL POS INIT message including a notification response of the SET user to the H-SLP to start the positioning session with the H-SLP. If it is checked that the notification performed by the SLP is based upon the location of the SET, the SET transmits to the H-SLP a SUPL POS INIT message which does not include a notification response to thusly start the positioning session with the H-SLP (S46). The SUPL POS INIT message may include at least session-id, SET capabilities and a location identifier (lid). The SET capabilities may include location measuring (positioning) methods (e.g., MS assisted A-GPS, MS based A-GPS, and cell-id method) and associated location measuring (positioning) protocols (e.g., RRLP, RRC, and TIA-801).

When the SUPL POS INIT message is received from the SET, the H-SLP transfers a RLP-SRLIR message including the ms-id and the location identifier (lid) thus to allow the V-SLP to calculate a coarse location of the SET (S47). The V-SLP calculates the coarse SET location using the location identifier (lid) and thereafter transfers the calculated coarse location of the SET through a RLP SRLIA message (S48).

If the coarse location of the SET satisfies the QoP required by the client, the H-SLP proceeds to the step S53. If not, the H-SLP determines which positioning protocol (RRLP, RRC, and TIA-801) should be used based upon the positioning method (posmethod) supported by the SET.

Therefore, the H-SLP and the SET sequentially exchange several successive positioning procedure message (RRLP, RRC, and TIA-801) to calculate the location of the SET (S49). The location is calculated based upon measurements that the H-SLP has received from the SET (MS assisted), or assistance that the SET has obtained from the V-SLP (MS based).

When the SUPL positioning process is completed, the H-SLP checks whether to grant permission for positioning of a user who has requested the positioning on the calculated location of the SET by directly requesting to the PCE or by using privacy information received from the PCE. According to the checked result, when a notification to the SET user is required to be performed (i.e., when positioning of the SET is conditionally granted), the H-SLP transmits a SUPL NOTIFY message including a notification element to the SET (S50). When receiving the SUPL NOTIFY message from the H-SLP, the SET recognizes the notification by the SLP is a notification based upon location. The SET then queries to the SET user as to whether the SET location value should be transmitted, and thereafter transmits a notification response of the SET user to the H-SLP through a SUPL NOTIFY RESPONSE message (S51).

Accordingly, the H-SLP transmits a SUPL END message to the SET to inform that the positioning process is not initiated any more (S52). Also, when the user's notification response included in the SUPL NOTIFY RESPONSE message is set to "allowed", namely, if the SET user grants permission for transmitting of the positioning resultant value (i.e., the calculated current location of the SET), the H-SLP transmits a MLP SRLIA message including the location value of the SET to the R-SLP (S53). The R-SLP finally transmits a MLP SLIA message including the location value of the SET to the SUPL agent (S54).

Figure 4:
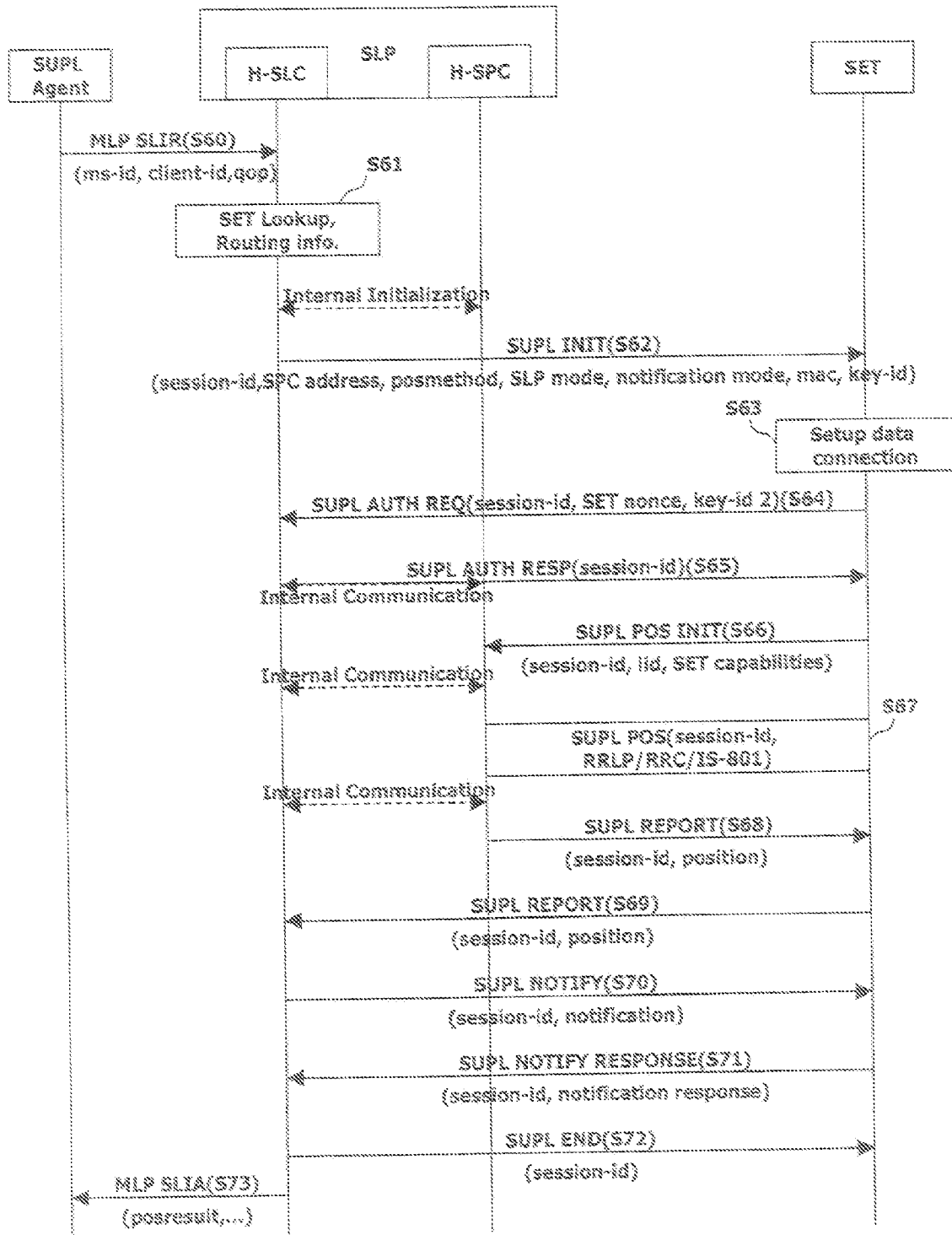
FIG. 4 illustrates a fourth embodiment of a location based notification method in a location information system according to the present invention, which illustrates a case that a terminal is not roaming in a non-proxy mode.

FIG. 4 illustrates a fourth embodiment of a location based notification method in a location information system according to the present invention, which illustrates a case that a terminal is not roaming in a non-proxy mode.

The fourth embodiment of the present invention illustrates a case that the SLP (i.e., Home SLP) is divided into a SUPL Location Center (SLC) and a SUPL Positioning Center (SPC) from its functional perspective to thus perform the positioning process. That is, in the fourth embodiment, the SLP is divided into the SPC for calculating a location of the SET by exchanging messages with the actual SET, and the SLC for performing other functions of the SLP excepting the function for calculating the location information of the SET, so that the SPC performs the positioning process directly with the SET and a information transfer between the SPC and the SLC is performed via an internal communication.

As illustrated in FIG. 4, the SUPL agent transfers the request for positioning of the LCS client to the H-SLC of the SLP through a MLP SLIR message (S60). The MLP SLIR message may include ms-id, lcs-client-id, QoP, and the like.

The H-SLC authorizes the SUPL agent based upon the lcs-client-id, and performs a subscriber privacy checking for the LCS client based upon the ms-id. The privacy checking, as aforementioned, can be performed by requesting to the PCE or by receiving privacy information from the PCE.

Also, the H-SLC determines whether the SET supports the SUPL using a SET lookup table. If necessary, the H-SLC checks whether the SET is roaming (i.e., whether the SET is currently located within a service area) using routing information (S61). Upon completing such series of operations, the H-SLC can exchange information needed to set a SUPL POS session with the SET through an internal initialization with the H-SPC.

Upon completing the checking of the SUPL agent authentication and the subscriber privacy checking, the H-SLC transmits a SUPL INIT message to the SET to start the SUPL session with the SET (S62). The SUPL INIT message may be a WAP PUSH or an SMS trigger, and include at least session-id, SPC address, positioning methods (posmethod), SLP mode (proxy/non-proxy), a notification mode, mac, key-id, and the like.

When receiving the SUPL INIT message from the H-SLC of the SLP, the SET is connected to a packet data network (e.g., a 3GPP or 3GPP2 network) when data connection is currently not opened (set) to any network (S63). The SET checks whether SLP uses a proxy or non-proxy mode using the SLP mode to thereafter transmit a SUPL authentication request (i.e., SUPL AUTH REQ) message to the H-SLC (S64). The SUPL AUTH REQ message may include session-id, key-id 2 and SET nonce.

The H-SLC generates a key to be used for an inter-authentication between the SPC and the SET using the key-id 2 and the SET nonce, and transfers the generated key to the H-SPC through an internal communication. The H-SPC then transmits a SUPL authentication response (i.e., SUPL AUTH RESP) message to the SET (S65).

When the SUPL AUTH RESP message is received, the SET estimates (approximates) notification rules to take an appropriate action. The SET checks whether the notification is performed based upon the location of the SET using the notification mode parameter value included in the SUPL INIT message. Further, the SET establishes a secure IP connection to the V-SPC to perform the inter-authentication with the V-SPC.

According to the checked result, when the notification performed by the H-SLP is not based upon the location of the SET, the SET transmits to the H-SPC a SUPL POS INIT message including the notification response of the SET user to start the positioning session with the H-SPC. If the notification is performed based upon the location of the SET, the SET transmits to the H-SPC a SUPL POS INIT message which does not include a notification response to start the positioning session with the H-SPC (S66). The SUPL POS INIT message may include session-id, SET capabilities and location identifier (lid). The SET capabilities may include location measuring (positioning) methods (e.g., MS assisted A-GPS, MS based A-GPS, and cell-id method) and associated location measuring (positioning) protocols (e.g., RRLP, RRC, and TIA-801).

The H-SPC calculates an initial location or a coarse location using the location identifier (lid) and checks whether the corresponding location meets QoP required by the SUPL agent. If the corresponding location meets the QoP required by the SUPL agent, the H-SPC transfers the corresponding location to the H-SLC via the internal communication. The H-SLC accordingly proceeds immediately to the step S73. If the corresponding location does not meet the QoP required by the SUPL agent, the H-SPC determines which positioning protocol (RRLP, RRC, and TIA-801) should be used based upon the SUPL POS INIT message to sequentially exchange several successive positioning procedure message (RRLP, RRC, and TIA-801), thereby performing the SUPL positioning process (S67).

Therefore, the H-SPC or SET calculates the location of the SET through the SUPL positioning process messages for the positioning. The location is calculated based upon measurements that the SLP has received from the SET (MS assisted), or assistance that the SET has obtained from the SLP (MS based).

When the location of the SET is completely calculated, the H-SPC queries to the H-SLC as to whether the notification or verification is performed based upon the location of the SET via the internal communication. When the notification or verification is performed based upon the location of the SET, the H-SPC transmits the calculated location of the SET to the SET through a SUPL reporting (i.e., SUPL REPORT) message (S68).

The SET transmits the received SUPL REPORT message to the H-SLC (S69), and the H-SLC transmits a SUPL NOTIFY message including a notification element to the SET (S70). The SET having received the SUPL NOTIFY message recognizes the notification performed by the H-SLC is based upon location. The SET queries to the SET user as to whether the SET location value should be transmitted and then transmits a notification response of the SET user to the H-SLC through a SUPL NOTIFY RESPONSE message (S71).

Hence, the H-SLC transmits a SUPL END message to the SET to inform that the positioning process is not initiated any more (S72). When the user's notification response included in the SUPL NOTIFY RESPONSE message is set to "allowed", namely, if the SET user grants permission for transmitting of the positioning resultant value (i.e., the calculated current location of the SET), the H-SLC transmits a MLP SLIA message including the location value of the SET to the SUPL agent (S73).

Figure 5:
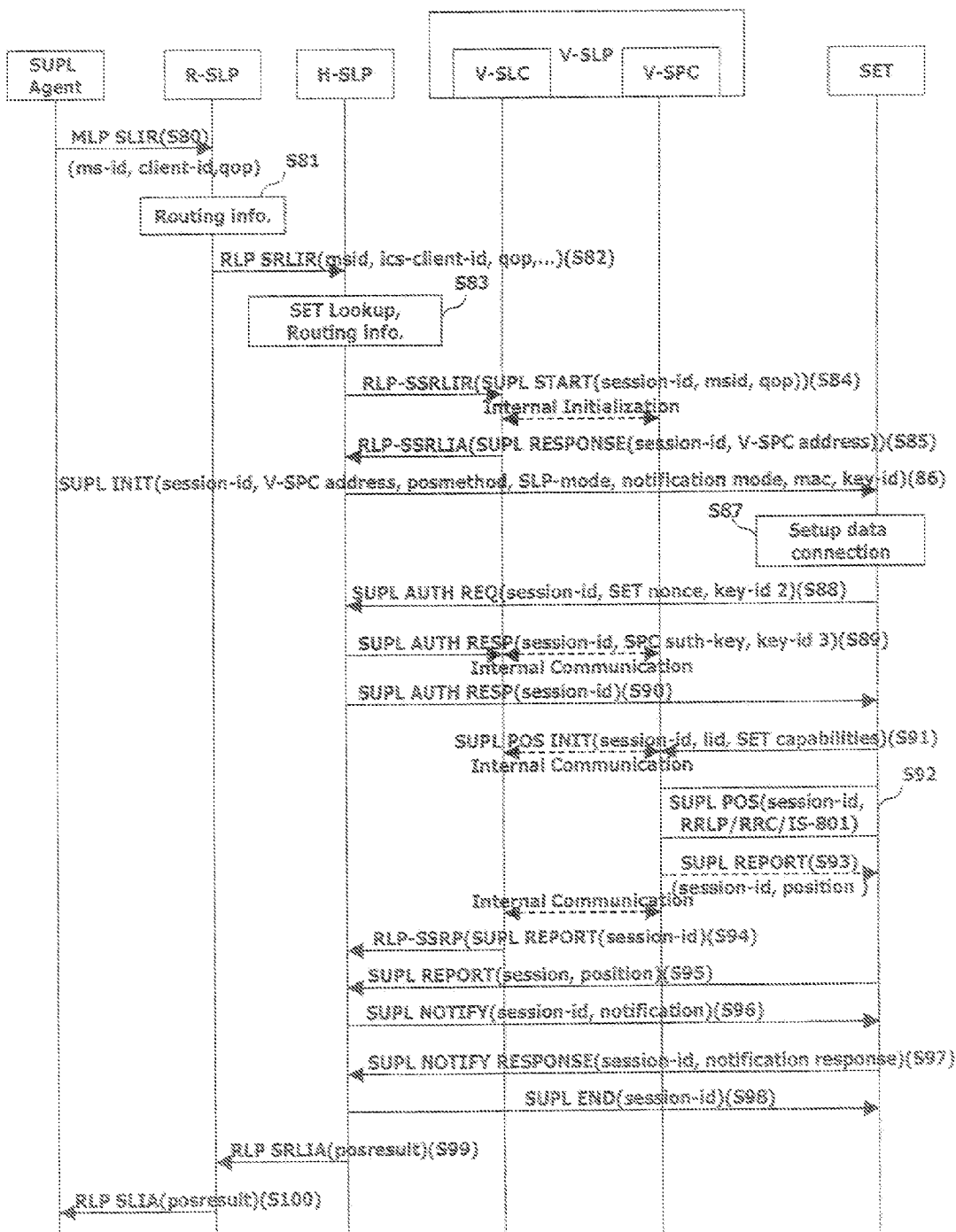
FIG. 5 illustrates a fifth embodiment of a location based notification method in a location information system according to the present invention, which illustrates a case that a terminal is roaming in a non-proxy mode.

FIG. 5 illustrates a fifth embodiment of a location based notification method in a location information system according to the present invention, which illustrates a case that a terminal is roaming in a non-proxy mode. The fifth embodiment of the present invention shown in FIG. 5 is the same as the fourth embodiment of the present invention excepting those fact that the H-SLP receives the positioning request made by the SUPL agent via the R-SLP, and RLP protocol messages are used such that messages are exchanged between the H-SLP and the V-SLC to thus initiate a SUPL session, transfer positioning session and inform the starting of the SUPL positioning process. Especially, the fifth embodiment of the present invention may be applied when the V-SPC performs positioning with the SET.

As illustrated in FIG. 5, the SUPL agent requests positioning of the LCS client from the R-SLP through a MLP SLIR message (S80). The MLP SLIR message may include ms-id, lcs-client-id, QoP, and the like.

The R-SLP which has received the MLP SLIR message checks whether the SUPL agent is authenticated for location services based upon the lcs-client-id, and determines a H-SLP based upon the ms-id. The R-SLP also checks whether the SET currently belongs to a service area (i.e., whether the SET is roaming) using routing information (S81). Upon completing such series of operations, the R-SLP transfers the request for the positioning of the LCS client to the H-SLP using a RLP protocol (i.e., RLP SLIR) message (S82).

The H-SLP then performs a privacy checking based on the ms-id and the lcs-client-id. The H-SLP determines whether the SET supports the SUPL using a SET lookup table, and also determines whether the SET currently belongs to a service area (i.e., whether the SET is roaming) using routing information (S83).

According to the result of the determination, when the SET supports the SUPL and is roaming, the H-SLP transmits a RLP-SSRLIR message to a V-SLC to inform that the SET is initiating a SUPL positioning process (S84). Further, when it is identified according to the result of the privacy checking that the notification and verification is performed based upon an actual location of the SET user, upon calculating the location, the H-SLP informs the V-SLC that collaboration is needed between the H-SLP and the V-SLC in order to apply a subscriber privacy with respect to the LCS client.

The V-SLC informs a termination of the SUPL positioning session to the V-SPC via an internal initialization. According to the privacy checking result, when the notification and verification is performed based upon the actual location of the SET user, upon calculating the location, the V-SLC informs the V-SPC that collaboration is needed between the V-SLC and the V-SPC in order to apply a subscriber privacy with respect to the LCS client.

In addition, the V-SLC informs the H-SLP that the SUPL positioning process is ready to be initiated through a RLP-SSRLIA message (S85). The RLP-SSRLIR message may include at least session-id, ms-id and QoP, while the RLP-SSRLIA message may include at least session-id and V-SPC address.

Thus, the H-SLP transmits a SUPL INIT message to the SET to start the positioning session with the SET (S86). The SUPL INIT message may be a WAP PUSH or an SMS trigger, and include at least session-id, V-SPC address, positioning methods (posmethod), SLP mode (proxy/non-proxy), a notification mode, mac, key-id, and the like.

When the SUPL INIT message is received from the H-SLP, the SET is connected to a packet data network (e.g., a 3GPP or 3GPP2 network) when data connection is currently not opened (set) to any network (S87). The SET checks whether the H-SLP uses a proxy or non-proxy mode using the SLP mode to thereafter transmit a SUPL AUTH REQ message to the H-SLP (S88). The SUPL AUTH REQ message may include session-id, key-id 2 and SET nonce.

The H-SLP generates a key to be used for an inter-authentication between the H-SPC and the SET using the key-id 2 and the SET nonce, and transfers the generated key to the V-SLC through the internal communication (89). The V-SLC then transfer the generated key to the V-SPC through the internal communication. The H-SLP also transmits a SUPL AUTH RESP message to the SET (S90).

When receiving the SUPL AUTH RESP message from the H-SLP, the SET estimates (approximates) notification rules to take an appropriate action. The SET checks whether the notification is performed based upon the location of the SET using the notification mode parameter value included in the SUPL INIT message. Further, the SET establishes a secure IP connection to the V-SPC to perform the inter-authentication with the V-SPC.

According to the checked result, when the notification is not performed based upon the location of the SET, the SET transmits to the V-SPC a SUPL POS INIT message including the notification response of the SET user to start the positioning session. If the notification is performed based upon the location of the SET, the SET transmits to the V-SPC a SUPL POS INIT message which does not include a notification response to start the positioning session with the V-SPC (S91). The SUPL POS INIT message may include at least session-id, location identifier (lid) and SET capabilities.

When the SUPL POS INIT message is received from the SET, the V-SPC informs the V-SLC that the positioning process is initiated through the internal communication, and determines which positioning protocol (RRLP, RRC, and TIA-801) should be used based upon the positioning method (posmethod) included in the SUPL POS INIT message.

Therefore, the V-SPC and the SET sequentially exchange several successive positioning procedure message (RRLP, RRC, and TIA-801) to calculate the location of the SET (S92). The location is calculated based upon measurements that the V-SPC has received from the SET (MS assisted), or assistance that the SET has obtained from the V-SPC (MS based).

When completely calculating the location of the SET, when the V-SLC indicates that the notification or verification is performed based upon the location of the SET via the internal initialization after the step S84, the V-SPC transmits the calculated location value of the SET to the SET through a SUPL REPORT message (S93), thus to inform the end of the positioning to the V-SLC. Accordingly, the V-SLC checks in the step S84 whether the H-SLP has indicated that the notification or verification is performed based upon the location of the SET. If so, the V-SLC transmits a RLP-SSRP message to the H-SLP to inform that the positioning is terminated (ended) (S94).

The SET transmits the SUPL REPORT message received from the V-SPC to the H-SLP (S95). The H-SLP then transmits a SUPL NOTIFY message including a notification element to the SET (S96). The SET which has received the SUPL NOTIFY message recognizes that the notification performed by the H-SLP is based upon the location. The SET then queries to the SET user as to whether the location value of the SET should be transmitted, and then transmits a notification response of the SET user to the H-SLP through a SUPL NOTIFY RESPONSE message (S97).

Thus, the H-SLP transmit a SUPL END message to the SET to inform that the positioning process is not initiated any more (S98). When the user's notification response included in the SUPL NOTIFY RESPONSE message is set to "allowed", namely, if the SET user grants permission for transmitting of the positioning resultant value (i.e., the calculated current location of the SET), the H-SLP transmits a MLP SRLIA message including the location value of the SET to the R-SLP (S99). The R-SLP finally transmits a MLP SLIA message including the location value of the SET to the SUPL agent (S100).

Figure 6:
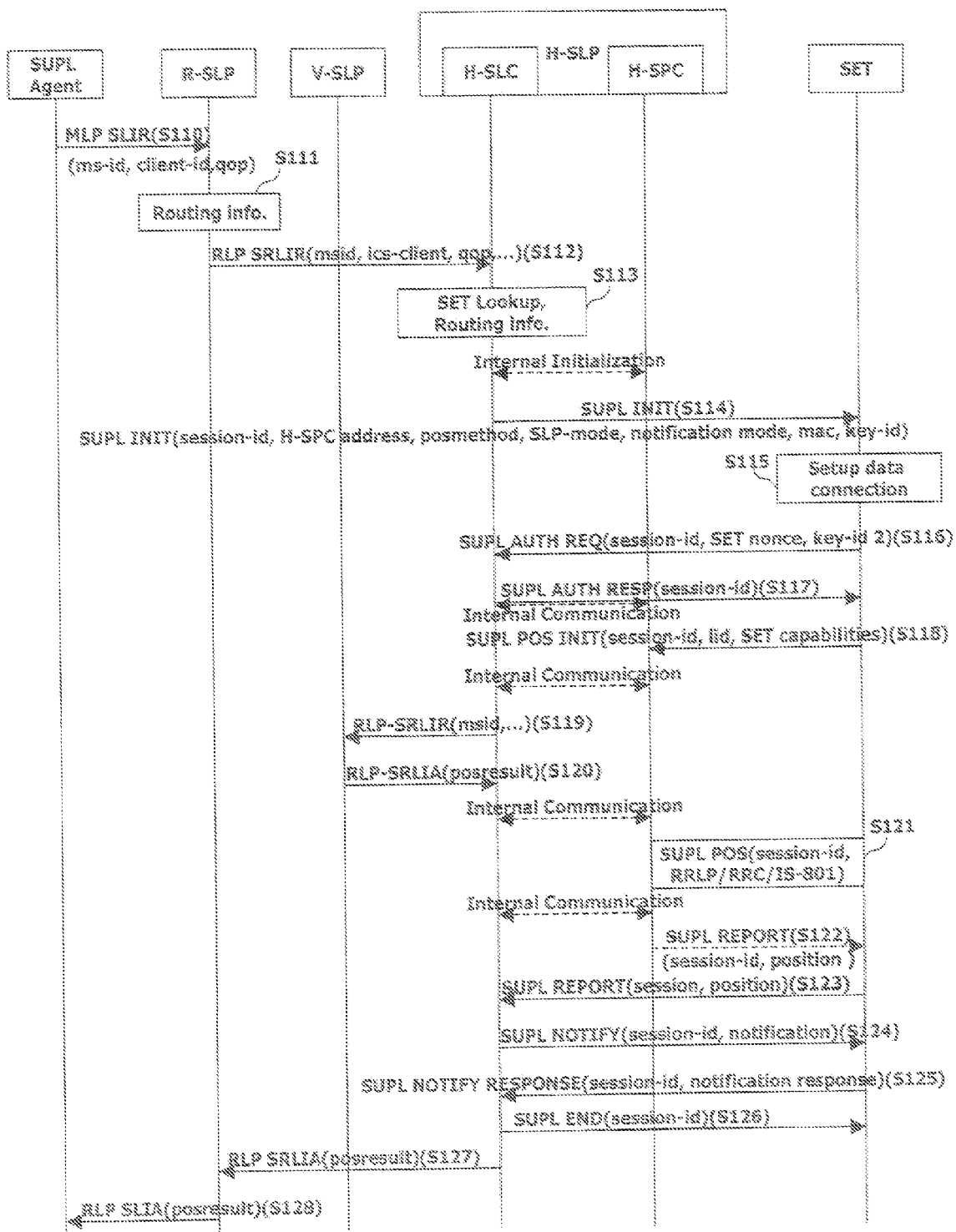
FIG. 6 illustrates a sixth embodiment of a location based notification method in a location information system according to the present invention, which illustrates a case that a terminal is roaming in a non-proxy mode.

FIG. 6 illustrates a sixth embodiment of a location based notification method in a location information system according to the present invention, which illustrates a case that a terminal is roaming in a non-proxy mode. The sixth embodiment of the present invention is the same as the fifth embodiment of the present invention excepting that the H-SPC performs positioning with the SET.

First, the SUPL agent transfers a request for positioning of the LCS client to the R-SLP through a MLP SLIR message (S110). The R-SLP checks whether the SUPL agent is authenticated for location service based upon the lcs-client-id, and determines a H-SLP based upon the ms-id. The MLP SLIR message may include ms-id, lcs-client-id, QoP, and the like. The R-SLP also checks whether the SET is currently located within a service area (i.e., whether the SET is roaming) using routing information (S111).

Upon completing such series of operations, the R-SLP transfers the request for the positioning of the LCS client through a RLP protocol (RLP SLIR) message (S112). The H-SLC performs a privacy checking based upon the ms-id and the lcs-client-id, and determines whether the SET supports the SUPL using a SET lookup table. The H-SLC also determines whether the SET is currently located within a service area (i.e., whether the SET is roaming) using routing information (S113). Further, the H-SLC informs the H-SPC of a (pending) SUPL positioning session through an internal initialization.

According to the determination, when the SET supports the SUPL and is roaming, the H-SLC transmits a SUPL INIT message to the SET to start the positioning session with the SET (S114). The SUPL INIT message may be a WAP PUSH or an SMS trigger, and include at least session-id, H-SPC address, positioning methods (posmethod), SLP mode (proxy/non-proxy), a notification mode, mac, key-id, and the like.

When the SUPL INIT message is received from the H-SLP, the SET is connected to a packet data network (e.g., a 3GPP or 3GPP2 network) when data connection is currently not opened (set) to any network (S115). The SET checks whether the SLP uses a proxy or non-proxy mode using the SLP mode to thereafter transmit a SUPL AUTH REQ message to the H-SLC (S116). The SUPL AUTH REQ message may include session-id, key-id 2 and SET nonce.

The H-SLC generates a key to be used for an inter-authentication between the H-SPC and the SET using the key-id 2 and the SET nonce, and transfers the generated key to the H-SPC through the internal communication (89). The H-SLC also transmits a SUPL AUTH RESP message to the SET (S117).

When receiving the SUPL AUTH RESP message from the H-SLC, the SET estimates (approximates) notification rules to take an appropriate action. The SET checks whether the notification is performed based upon the location of the SET using the notification mode parameter value included in the SUPL INIT message. Further, the SET establishes a secure IP connection to the H-SPC to perform the inter-authentication with the H-SPC.

According to the checked result, when the notification performed by the H-SLC is not based upon the location of the SET, the SET transmits to the H-SPC a SUPL POS INIT message included in the notification response of the SET user to start the positioning session. If the notification is performed based upon the location of the SET, the SET transmits to the H-SPC a SUPL POS INIT message which does not include a notification response to start the positioning session with the H-SPC (S118). The SUPL POS INIT message may include session-id, location identifier (lid) and SET capabilities.

When the SUPL POS INIT message is received from the SET, the H-SPC informs the H-SLC that the positioning process is initiated through the internal communication. The H-SLC transfers to the V-SLP a RLP-SRLIR message which includes the ms-id and the location identifier (lid) so as to allow the V-SLP to calculate a coarse location of the SET (S119). The V-SLP calculates the coarse location of the SET using the lid to transfer it to the H-SLC through a RLP SRLIA message (S120).

The H-SLC informs the H-SPC of the coarse location of the SET through the internal communication. If the coarse location of the SET meets the QoP required by the client, the H-SPC proceeds to the step of S122. Conversely, if the coarse location of the SET does not meet the QoP required by the client, the H-SPC determines which positioning protocol (RRLP, RRC, and TIA-801) should be used based upon the positioning method (i.e., posmethod) supported by the SET.

Therefore, the H-SPC and the SET sequentially exchange several successive positioning procedure message (RRLP, RRC, and TIA-801) to calculate the location of the SET (S121). The location is calculated based upon measurements that the H-SPC has received from the SET (MS assisted), or assistance that the SET has obtained from the V-SPC (MS based).

When completely calculating the location of the SET, the H-SPC queries through the step S114 whether the H-SLC has indicated that the notification or verification is performed based upon the location of the SET. If the H-SLC has indicated that the notification or verification is performed based upon the location of the SET, the H-SPC transmits the calculated location value of the SET to the SET through a SUPL REPORT message (S122).

The SET transmits the SUPL REPORT message received from the H-SPC to the H-SLC (S123). The H-SLC then transmits a SUPL NOTIFY message including a notification element to the SET (S124). The SET which has received the SUPL NOTIFY message recognizes that the notification performed by the H-SLC is based upon the location. The SET then queries to the SET user as to whether the location value of the SET should be transmitted, and then transmits a notification response of the SET user to the H-SLC through a SUPL NOTIFY RESPONSE message (S125).

Thus, the H-SLC transmit a SUPL END message to the SET to inform that the positioning process is not initiated any more (S126). When the user's notification response included in the SUPL NOTIFY RESPONSE message is set to "allowed", namely, if the SET user grants permission for transmitting of the positioning resultant value (i.e., the calculated current location of the SET), the H-SLC transmits a MLP SRLIA message including the location value of the SET to the R-SLP (S127). The R-SLP finally transmits a MLP SLIA message including the location value of the SET to the SUPL agent (S128).

Figure 7:
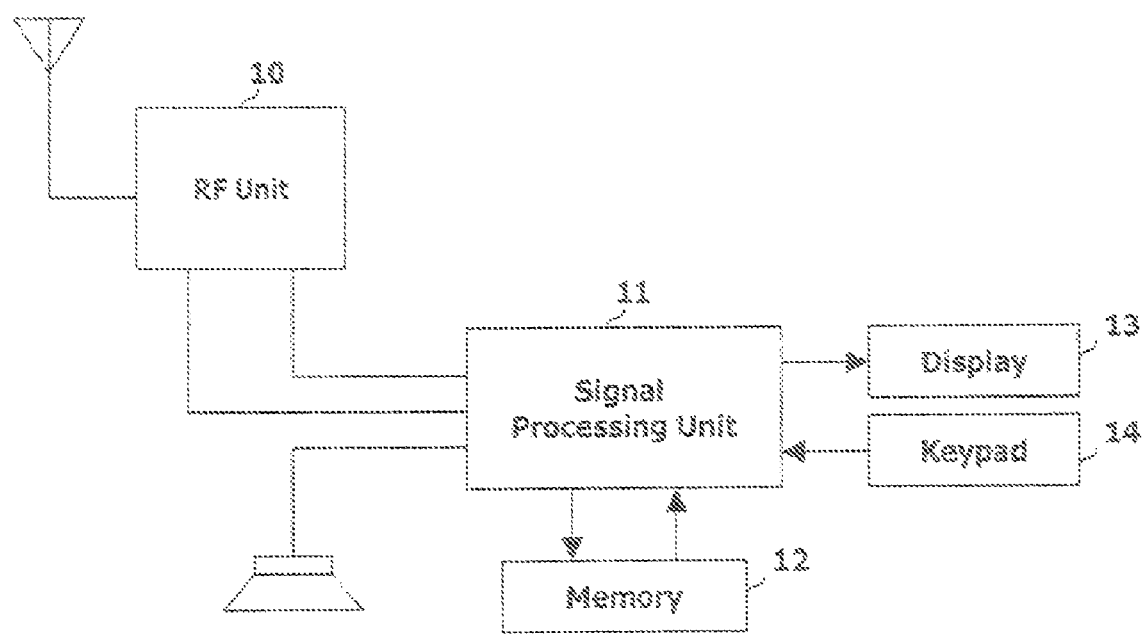
FIG. 7 illustrates a schematic structure of a mobile communications terminal adapted to a location information system according to the present invention.

FIG. 7 illustrates a schematic structure of a mobile communications terminal which is applied to a location information system according to the present invention.

As illustrated in FIG. 7, a Radio Frequency (RF) unit 10 is provided with a transmitter and a receiver, thus to receive various messages transmitted from a location server via an antenna, such as a session initial message including a notification mode parameter (indicator), or to receive a session notification message from the location server after positioning, and to transmit a user's notification response for the session notification message to the location server. Also, the RF unit 10 transmits and receives various messages for performing positioning between the location server and a terminal (e.g., SET).

A signal processing unit 11 which includes a processor checks the received notification mode parameter to thus determine whether the notification is performed by the location server based upon a location of the terminal. According to the checked result, when the notification mode parameter is a notification/verification based upon location, the terminal does not transmit a session end message until receiving the session notification message. That is, when the notification is performed based upon the location of the terminal, the signal processing unit 11 receives the session notification message from the location server. The signal processing unit 11 accordingly informs a terminal user of the reception of the session notification message by use of a display and transmits a notification response of the terminal user inputted by means of a keypad 14 to the location server via the RF unit 10. Such operations implementing the present invention and their results are stored in a memory 12.

In addition, the SET adapted in the present invention may is denote a device which is capable of communicating with a SUPL network which uses a SUPL interface. For example, the SET may be one of UE (User Equipment) of UMTS, Mobile Station (MS) of GSM, IS-95 MS or laptop computers or PDAs having a SET function therein. Further, the SET denotes a variety of mobile terminals which are connected through a WLAN, which is referred to as a terminal in the present invention.

As described above, in the present invention, when an application (i.e., a server system) notifies a SET (or a SET user) of positioning of the SET requested by a third party (i.e., a client system), the SET can be informed as to whether the corresponding notification is performed based upon location, thus to determine a time point of a notification response, resulting in stabilization of the system.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A location based notification method in a H-SLP (Home-SUPL (Secure User Plane) Location Platform) for calculating and providing a location of a roaming terminal according to a client's request, the method comprising:
    receiving, by the H-SLP, a client's request for positioning of a roaming terminal;
    transmitting, by the H-SLP, a SUPL INIT (SUPL Initialization) message to the roaming terminal before a connection with the roaming terminal is established, the SUPL INIT message including a notification mode parameter indicating whether or not a notification and verification based on the location of the roaming terminal are to be performed after the location of the roaming terminal is calculated;
    transferring, by the H-SLP, a positioning start message to a V-SLP (Visited-SUPL (Secure User Plane) Location Platform) to start the calculation of the location of the roaming terminal with the V-SLP, if the H-SLP receives a SUPL POS INIT (SUPL Positioning Initialization) message from the roaming terminal in response to the SUPL INIT message;
    receiving, by the H-SLP, the calculated location of the roaming terminal from the V-SLP after the transferring step;
    after receiving the calculated location of the roaming terminal from the V-SLP, transmitting, by the H-SLP, a SUPL NOTIFY message including a notification element to the roaming terminal if the notification mode parameter indicates that the notification and verification based on the location of the roaming terminal are to be performed;
    receiving, by the H-SLP from the roaming terminal in response to the SUPLY NOTIFY message, a SUPL NOTIFY RESPONSE message that includes a verification indicating whether to allow or not allow a provision of the calculated location of the roaming terminal to the client; and
    transmitting, by the H-SLP, the calculated location of the roaming terminal to the client in response to the received SUPL NOTIFY RESPONSE message when the received SUPL NOTIFY RESPONSE message includes the verification indicating to allow the provision of the calculated location of the roaming terminal to the client.

2. The method of claim 1, further comprising:
    transferring, by the H-SLP, an end message to the roaming terminal before transmitting the calculated location of the roaming terminal after receiving the SUPL NOTIFY RESPONSE message.

3. The method of claim 1, further comprising:
    transmitting, by the H-SLP, a message for notifying a start of positioning to the V-SLP before transmitting the SUPL NIT message but after receiving the client's request for positioning of the roaming terminal; and
    receiving, by the H-SLP, a response message for notifying that the start of positioning is prepared from the V-SLP in response to the message for notifying the start of positioning.

4. The method of claim 1, wherein the positioning start message is transferred by using an RLP SSRP (Standard SUPL Roaming Position) message.

5. The method of claim 1, wherein the step of receiving the calculated location of the roaming terminal from the V-SLP is performed by using an RLP SSRP (Standard SUPL Roaming Position) message.

6. The method of claim 1, wherein the calculated location of the roaming terminal is obtained by the V-SLP that cooperates with the roaming terminal.

7. The method of claim 1, further comprising:
    before a releasing step, transmitting, by the H-SLP, a session end message to the roaming terminal after receiving the SUPL NOTIFY RESPONSE message when the notification mode parameter indicates that the notification and verification based on the location of the roaming terminal are to be performed; and
    releasing the connection with the roaming terminal after transmitting the session end message.

* * * * *